United States Patent [19]
Akashi et al.

[11] Patent Number: 5,707,543
[45] Date of Patent: Jan. 13, 1998

[54] REVERSIBLE DISPLAY MEDIUM

[75] Inventors: Ryojiro Akashi; Takashi Morikawa; Masanobu Ninomiya; Takashi Uematsu, all of Minami-ashigara, Japan

[73] Assignee: Fuji Xerox Co., Ltd., Tokyo, Japan

[21] Appl. No.: 411,201

[22] Filed: Mar. 27, 1995

[30] Foreign Application Priority Data

May 11, 1994 [JP] Japan .................... 6-120753

[51] Int. Cl.$^6$ .............................. C09K 19/52; G02F 1/13
[52] U.S. Cl. .................... 252/299.01; 349/2; 349/177; 349/183; 428/1
[58] Field of Search .................... 252/299.01; 349/2; 349/177, 183; 428/1

[56] References Cited

U.S. PATENT DOCUMENTS

| | | | |
|---|---|---|---|
| 4,965,591 | 10/1990 | Kurabayashi et al. | 346/108 |
| 5,038,166 | 8/1991 | Isaka et al. | 355/27 |
| 5,178,710 | 1/1993 | Hikmet et al. | 156/272.2 |
| 5,210,630 | 5/1993 | Heynderickx et al. | 359/106 |
| 5,298,476 | 3/1994 | Hotta et al. | 503/201 |
| 5,332,520 | 7/1994 | Bach et al. | 252/299.01 |
| 5,354,498 | 10/1994 | Akashi et al. | 252/299.01 |
| 5,426,009 | 6/1995 | Coates et al. | 430/20 |

FOREIGN PATENT DOCUMENTS

| | | |
|---|---|---|
| A-54-119377 | 9/1979 | Japan . |
| A-55-154198 | 12/1980 | Japan . |
| A-60-180887 | 9/1985 | Japan . |
| A-62-116192 | 5/1987 | Japan . |
| A-2-42415 | 2/1990 | Japan . |
| A-2-117888 | 5/1990 | Japan . |
| A-3-53285 | 3/1991 | Japan . |

OTHER PUBLICATIONS

*Eur. Polym. J.*, vol. 18 (1982), pp. 651–659, Valery P. Shibaev et al; Thermotropic Liquid–Crystalline Polymers—VI*, "Comb–like Liquid–Crystalline Polymers Of The Smectic and Nematic Types with Cyanobiphenyl Groups in the Side–chains".

*Makromol. Chem.*, vol. 179 (1978), pp. 273–276, Heino Finkelmann et al.; Model Considerations and Examples of Enantiotropic Liquid Crystalline Polymers, "Polyreactions in Ordered Systems, 14*".

*Mol. Cryst. Liq. Cryst.*, vol. 169 (1989), pp. 167–192, T. Nakamura et al.; "Application of Side Chain Type Liquid Crystal Polymer for Display and Recording Devices".

Japan Display, Opto–Electronics Research Laboratories, NEC Corporation, Kawasaki, Kanagawa, 8.4 (1986), "Thermo–Optical Effect in Polymeric Liquid Crystal For Display Applications", T. Ueno et al.; pp. 290–292.

Polymer Communications, vol. 24, Dec. (1983), "Thermotropic Liquid–crystalline polymers: 4. Thermo–recording on liquid–crystalline polymers with the aid of a laser beam", V.P. Shibaev et al.; pp. 364–365.

Makromol. Chem. 188 (1987), "Stress–induced Orientation in Lightly Crosslinked Liquid–crystalline Side–group Polymers", Rudolf Zentel et al.; pp. 665–674.

*Primary Examiner*—Shean C. Wu
*Attorney, Agent, or Firm*—Oliff & Berridge

[57] ABSTRACT

A reversible display medium capable of repeatedly exhibiting a transparent state and a light-scattering state by an action of at least one of heat, electric field, and magnetic field, the medium comprising a substrate having thereon a recording layer comprising a side-chain high molecular weight liquid crystal, which is a copolymer comprising at least a liquid-crystal monomer component and a non-liquid-crystal monomer component having a substituent capable of making a hydrogen bond.

17 Claims, 1 Drawing Sheet

REVERSIBLE DISPLAY MEDIUM

FIELD OF THE INVENTION

The present invention relates to a reversible display medium. More particularly, the present invention relates to a display medium favorable for conservation of resources which can be used as heat-sensitive paper which can be repeatedly used, projector display medium such as OHP display sheet or white board-like large area display medium.

BACKGROUND OF THE INVENTION

Paper has been used as media for display and preservation of data in a long time. Although the recent spread of flat panel display has brought about a trend toward paperless communications, the quantity of paper consumed has been increased rather than decreased. This can be thought because paper is a reflective display harmless to the eyes and storage medium having an excellent flexibility and portability. Besides using paper, the use of a polyester film having a toner image formed thereon in combination with an overhead projector (OHP) is a common practice to provide a large area display. However, mass use of paper and plastics creates problems from the standpoint of conservation of resources and environmental pollution.

Under these circumstances, technology for display media substituting for paper has been studied. For example, a reversible heat-sensitive display medium comprising an organic low molecular weight compound dispersed in a high molecular weight matrix is disclosed in JP-A-54-119377 (The term "JP-A" as used herein means an "unexamined published Japanese patent application") and JP-A-55-154198. This reversible heat-sensitive display medium can perform display by controlling heat applied thereto so that light scattering and transmission are controlled. A reversible heat-sensitive display medium comprising a recording layer having a blend of a plurality of high molecular weight compounds as disclosed in JP-A-60-180887 and JP-A-62-116192 can perform display by controlling phase separation with heat. Further, JP-A-2-117888 and JP-A-3-53285 disclose a reversible display medium comprising a high molecular weight liquid crystal which employs the similar mechanisms as above to perform display.

These display media normally perform display by controlling the application of heat via thermal head or heated roll.

The reversible heat-sensitive display medium comprising as a recording layer a layer having an organic low molecular weight compound dispersed in a high molecular weight media or a layer comprising a blend of a plurality of high molecular weight compounds reversibly repeats a light transmission state and a light scattering state by thermally controlling the compatibility state of two mixing components. However, the reversible heat-sensitive display medium of this type is disadvantageous in that the repetition of these states deteriorates the mixing components or makes the transition/scattering states unclear, causing a deterioration in contrast. This restricts the maximum allowable number of repetition.

Further, the reversible display medium comprising a known high molecular weight liquid crystal is disadvantageous in that it exhibits a low display contrast and insufficient data storage stability and heat sensitivity.

The display medium comprising a high molecular weight liquid crystal as a recording layer is disadvantageous in that it is subject to the thermal deterioration of the material or the surface deformation such as surface unevenness due to printing pressure during recording by means of a thermal head, restricting the maximum allowable number of repetition. Further, if a heat-resistant surface protective layer is provided on the recording layer, it is disadvantageous in that the volume shrinkage of the protective layer causes the high molecular weight liquid crystal layer to be oriented and thus the display medium becomes transparent.

In the technology employing a high molecular weight liquid crystal, JP-A-2-42415 proposes an approach which comprises crosslinking the high molecular weight liquid crystal to enhance the heat resistance of the recording layer and hence inhibit the surface deformation during printing. However, the crosslinking of the high molecular weight liquid crystal can disadvantageously inhibit the orientation of the liquid crystal molecules, deteriorating the performance thereof.

SUMMARY OF THE INVENTION

An object of the present invention is to provide a reversible display medium having improved repeatability, durability, heat sensitivity, display contrast and storage stability.

Other objects and effects of the present invention will be apparent from the following description.

The inventors made extensive studies of a high molecular weight liquid crystal constituting a recording layer. As a result, it was found that the use of a side chain type high molecular weight liquid crystalline copolymer comprising as essential components, at least two components, i.e., a liquid-crystal monomer and a non-liquid-crystal monomer having hydrogen-bonding substituents, as a high molecular weight liquid crystal optimizes the multi-domain structure of the high molecular weight liquid crystal which dominates the display performance and enhances the mechanical strength. It also optimizes the heat sensitivity of the recording layer. It further provides a drastic improvement in repeatability, durability, heat sensitivity, contrast, and data storage stability required for display medium. Thus, it provides optimum properties required for reversible display medium. As a result, the present invention has been worked out.

The present invention relates to a reversible display medium capable of repeatedly exhibiting a transparent state and a light-scattering state by an action of at least one of heat, electric field, and magnetic field, the medium comprising a substrate having thereon a recording layer comprising a side-chain high molecular weight liquid crystal, which is a copolymer comprising at least a liquid-crystal monomer component and a non-liquid-crystal monomer component having a substituent capable of making a hydrogen bond.

BRIEF DESCRIPTION OF THE DRAWINGS

By way of example and to make the description more clear, reference is made to the accompanying drawings in which.

DETAILED DESCRIPTION OF THE INVENTION

Figure 1:
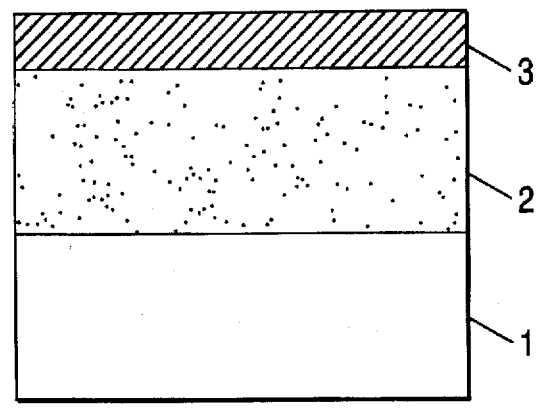
FIG. 1 is a section view of an embodiment of the reversible display medium of the present invention.
Figure 2:
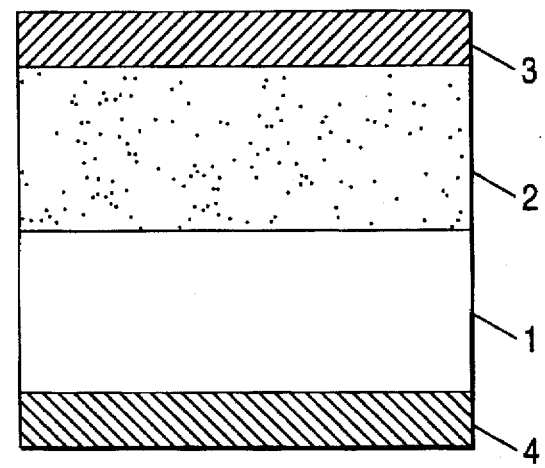
FIG. 2 is a section view of another embodiment of the reversible display medium of the present invention, in which the display medium in FIG. 1 further comprises a colored layer.
Figure 3:
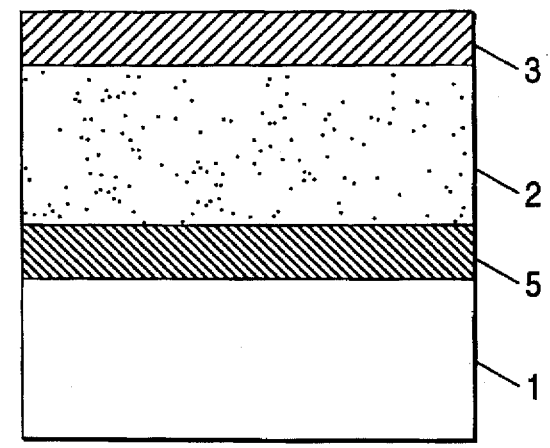
FIG. 3 is a section view of further embodiment of the reversible display medium of the present invention, in which the display medium in FIG. 1 further comprises a light reflecting layer.

An example of a typical layer configuration of the reversible display medium of the present invention is shown in FIG. 1. The display medium of the present invention according to the present invention performs displaying when acted on by heat only or by heat with electric field or magnetic field. In its basic configuration, the display medium of the present invention comprises a substrate 1 laminated with a recording layer 2. If necessary, the recording layer 2 may have a protective layer 3 provided thereon for the purpose of improving the surface strength and heat resistance thereof. Further, the display medium of the present invention may preferably have a colored layer 4 provided on the opposite side of the substrate 1 as shown in FIG. 2. As shown in FIG. 3, the display medium of the present invention may preferably have a light reflecting layer 5 or a light absorbing layer provided interposed between the substrate 1 and the recording layer 2. In a display medium of the type performing display by electric field, a recording layer is preferably provided interposed between two sheets of substrates with an electrode.

Examples of the substrate for the display medium of the present invention include a high molecular weight films (e.g., a polyethylene terephthalate (PET) film, a polyethylene naphthalate film, a polyethylene film, a polypropylene film, a butadiene film, a polyimide film, and a nylon film), paper, ceramic, glass, metal or the like. Examples of the substrate with an electrode include a transparent electrically-conductive glass or film (e.g., an ITO glass or film). In the case where the display medium is of the transmission type, a transparent substrate is preferably used.

The recording layer will be further described hereinafter.

As mentioned above, the side chain type high molecular weight liquid crystal (hereinafter sometimes referred to as "high molecular weight liquid crystal") of the present invention is a copolymer of at least two components, i.e., a liquid-crystal monomer and non-liquid-crystal monomer having a substituent capable of making a hydrogen bond (hereinafter sometimes referred to as "hydrogen-bonding substituent"). The hydrogen bond makes it possible to obtain an excellent heat resistance and mechanical strength without deteriorating the properties of the high molecular weight liquid crystal. Thus, the surface deterioration which can occur during recording (displaying) by thermal head or the like can be prevented.

The term "liquid-crystal monomer" as used herein is meant to indicate a polymerizable compound having mesogen (rigid molecule or atomic group having liquid-crystal characteristics) substituents which may or may not exhibit liquid-crystal before polymerization but exhibits liquid-crystal after polymerization. The term "non-liquid-crystal monomer" as used herein is meant to indicate a polymerizable compound free of mesogen substituents.

The high molecular weight liquid-crystal copolymer can be prepared by mixing the foregoing monomers in predetermined amounts; subjecting the mixture to ordinary radical polymerization, ionic polymerization, or addition reaction with a reactive polymer such as polyhydrogenated polysilicone; and then optionally purifying the product. Two or more of these polymerizable monomers may be used, respectively.

Examples of the liquid-crystal monomer component employable in the present invention include those disclosed in Makromol. Chem., vol. 179, page 273 (1978), *Eur. Polym. J.*, vol. 18, page 651 (1982), and *Mol. Cryst. Liq. Cryst.*, vol. 169, page 167 (1989).

Specific examples of these liquid-crystal monomers include various compounds composed of acrylic ester molecules, methacrylic ester molecules, or vinyl groups bonded to rigid liquid-crystal functional groups such as biphenyl, phenyl benzoate, cyclohexylbenzene, azoxybenzene, azobenzene, azomethine, phenylpyrimidine, diphenylacetylene, biphenyl benzoate, cyclohexyl biphenyl and terphenyl functional groups, via an alkyl spacer having a predetermined length.

Examples of the liquid-crystal monomer include those represented by formulae (a) and (b):

$CH_2=C(R)$—$COO$—$(CH_2)_m$—$O$—$A$ (a) $CH_2=CH(CH_2)_m$—$O$—$A$ (b)

wherein R represents a hydrogen atom or a methyl group; A represents a liquid-crystal molecule (mesogen) residue represented by the following structural formula; and m represents an integer 1 to 30. Among these, monomers represented by formula (a) are preferably used in the present invention.

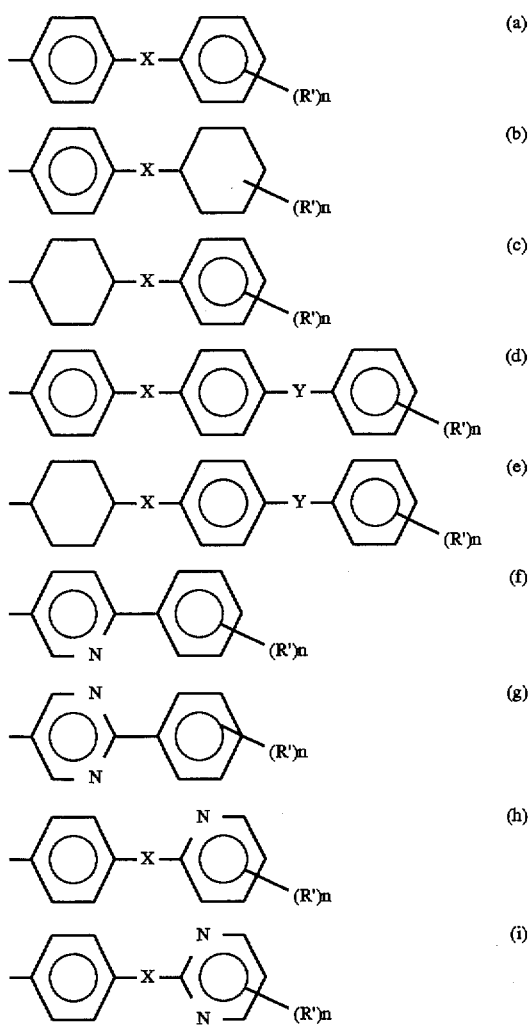

wherein X and Y may be the same or different and each represent a single bond, —N=N—, —N(→)=N—, —CH= N—, —N=CH—, —COO—, —O(C=O)—, or —CH= CH—; R' represents a halogen atom, an alkyl group, an alkoxy group, a carboxyl group, or a cyano group; and n represents an integer 1 to 5, with the proviso that when n is an integer of not less than 1, the plurality of groups represented by R' may be the same or different.

Examples of the non-liquid-crystal monomer component having hydrogen-bonding substituents employable in the present invention include various polymerizable monomers having a hydroxyl group, a carboxyl group, a sulfonic group, a phosphoric group, a primary amino group, a secondary amino group, an acid amide group, a thiol group, etc.

Specific examples of these polymerizable monomers include (meth)acrylic acid, 2-hydroxyethyl (meth)acrylate, 2-hydroxypropyl (meth)acrylate, 2-hydroxy-3-phenoxypropyl (meth)acrylate, glyceryl (meth)acrylate, (meth)acrylamide, 2-(meth)acryloyloxyethyl succinate, 2-(meth)acryloyloxyethyl phthalate, 2-(meth) acryloyloxyethyl-2-hydroxyethyl phthalate, 2-(meth) acryloyloxyethyl hexahydrophthalate, 4-((meth) acryloxyalkyloxy)benzoic acid, mono-2-(meth) acryloyloxyethyl phosphate, di-2-(meth)acryloyloxyethyl phosphate, hydroxy-substituted styrene, vinylsulfonic acid, 2-propene-1-ol, and 5-hexene-1-ol. Particularly useful among these polymerizable monomers are polymerizable monomers having an acidic group such as a carboxyl group, a sulfonic group and a phosphoric group, and polymerizable monomers having an alcoholic or phenolic hydroxyl group, which can provide a high hydrogen bonding strength. Among these, particularly preferred are (meth)acrylic acid, 2-hydroxyethyl (meth)acrylate, 2-hydroxypropyl (meth) acrylate, and 2-hydroxy-3-phenoxypropyl (meth)acrylate.

The term "(meth)acrylic" and the like used herein means "acrylic or methacrylic" and the like.

As mentioned above, the high molecular weight liquid-crystal copolymer of the present invention comprises the foregoing two monomers as essential components. The high molecular weight liquid-crystal copolymer of the present invention may comprise a plurality of liquid-crystal monomers and non-liquid-crystal monomers. As the non-liquid-crystal monomers, various ordinary monomers free of hydrogen-bonding substituents can be used as third components. The use of these various ordinary monomers free of hydrogen-bonding groups is also advangateous for the improvement of heat-sensitive properties and display properties. Preferred examples of these monomers include alkyl (meth)acrylate and derivatives thereof, styrene and derivatives thereof, vinyl acetate, vinyl chloride, vinylidene chloride, vinyl pyrrolidone, isoprene, 1-hexene, and 1-octene. Among these, alkyl (meth)acrylate is preferred. The amount of the non-liquid-crystal monomers free of hydrogen-bonding substituents is generally in the range of 10 to 90% by weight based on the total amount of the non-liquid-crystal monomers.

The copolymerization ratio of the foregoing two components in the high molecular weight liquid-crystal copolymer can be varied widely depending on the target properties. The content of the non-liquid-crystal monomer is preferably in the range of 0.1 to 50% by weight, more preferably 1 to 40% by weight, particularly preferably 1 to 20% by weight, based on the total amount of the liquid-crystal monomers and the non-liquid-crystal monomers. If the content of the non-liquid-crystal monomer is less than 10% by weight, the resulting recording layer tends to have insufficient strength. If the content of the non-liquid-crystal monomer is more than 50% by weight, it may deteriorates the properties of the liquid crystal.

The essential components of the liquid-crystal copolymer may be in any known form such as random copolymers, graft copolymers and alternating copolymers.

The weight-average molecular weight of the copolymer is generally in the range of 1,000 to 1,000,000. It is preferably in the range of 10,000 to 500,000 from the standpoint of film-forming properties, strength and speed of response. If the weight-average molecular weight of the copolymer is less than 1,000, the resulting copolymer tends to exhibit reduced film-forming properties and self-retention properties. If the weight-average molecular weight of the copolymer is more than 1,000,000, the response or orientability in an electric field is deteriorated.

The recording layer of the present invention comprises the foregoing copolymer as an essential component and may further comprise other various components. For example, various oxidation inhibitors such as hindered amine and hindered phenol may be added for the purpose of improving the weathering resistance of the recording layer. For the purpose of improving the display contrast, various dichromatic dyes such as anthraquinone, styryl, azomethine and azo dyes may be added. For the purpose of improving the light scattering properties, various fluorescent dyes may be added. Further, various laser beam-absorbing dyes (in the case where an ordinary semiconductor laser beam of 780 to 830 nm is emitted, a near infrared ray-absorbing dye such as phthalocyanine, squalilium and azlenium can be used) are preferably added to provide an efficient thermal writing by laser beams.

The added amount of these components is preferably in the range of 0.01 to 5% by weight based on the weight of the liquid crystal composition (i.e., a recording layer). Besides the foregoing components, a low molecular liquid crystal may be added in an amount of 1 to 20% by weight for the purpose of improving the display properties.

The recording layer can be formed by an ordinary method such as coating method using a solvent coating method or a heat fusion coating method. The thickness of the recording layer is not specifically limited. It may be properly determined by the desired contrast, and is preferably in the range of 1 to 100 µm, particularly preferably 3 to 20 µm.

In the display medium of the present invention, the protective layer which is optionally formed on the recording layer preferably has a high heat resistance. For example, a fluorine polymer, silicone polymer, thermosetting polymer, ultraviolet-curing polymer, electron radiation-curing polymer, etc. can be used. The protective layer may be in the form of a laminate consisting of a plurality of layers. The protective layer may be formed by the same coating method as used for the recording layer or the like methods. The thickness of the protective layer is preferably in the range of 0.1 to 20 µm.

For the purpose of improving the contrast of the display medium, a color layer, a light reflecting layer, or a light absorbing layer is preferably provided as a constituent of the display medium. Examples of the color layer include a high molecular weight film layer containing a dye. Examples of the light reflecting layer include a layer of metal such as aluminum and silver. The thickness of such a colored layer, a light reflecting layer, or a light absorbing layer is preferably in the range of 1 nm to 100 µm.

The high molecular weight liquid crystal constituting the recording layer in the reversible display medium of the present invention preferably has a multi-domain structure composed of a plurality of liquid crystalline domains from the standpoint of display properties (light scattering properties). The multi-domain structure can be optimized by properly changing the amount ratios of the liquid crystal monomer component and non-liquid crystal monomer component constituting the high molecular weight liquid crystal and the heating-cooling conditions. High light scattering properties can be obtained to attain an excellent display contrast particularly when the domain diameter at the maximum distributed number of domains is not more than 3 μm, especially not more than 1.5 μm, which falls within the range of the visible light wavelength. The domain structure thus optimized is preferably used in the present invention.

The recording layer having a multi-domain structure can be prepared by the following manner: A liquid-crystal monomer and a non-liquid-crystal monomer having a hydrogen-bonding substituent are polymerized by using a polymerization initiator to prepare a copolymer as a side-chain high molecular weight liquid crystal. The copolymer is purified if necessary and is coated on a substrate by using a solvent, followed by drying. The coated layer of the high molecular weight liquid crystal is then heated to a temperature higher than the temperature at which the liquid crystal is transfer from a liquid crystal state to an isotropic phase, which is generally 5° to 40° C. higher than the phase transfer point of the liquid crystal. While depending on the characteristics of the resulting high molecular weight liquid crystal, the temperature at which the liquid crystal is transfer from a liquid crystal state to an isotropic phase is generally in the range of 60° to 200° C. Accordingly, the coated layer is then heated to a temperature of this range.

Before heating, the coated layer of the high molecular weight liquid crystal is in a opaque state and becomes transparent by heating to the temperature at which the liquid crystal is transfer from a liquid crystal state to an isotropic phase or higher. It is then cooled to room temperature to prepare a reversible display medium of the present invention having an optimized domain structure. The cooling rate is generally $-1\times10^{2°}$C./sec or less, preferably $-50°$ C./sec or less. If the cooling rate is too high, the transparent state of the heated liquid crystal layer is maintained.

The above cooling rates can be applied to recording. The state of the heated part of the display medium after cooling can be controlled by the cooling rate, i.e., a cooling rate higher than about $-1\times10^{2°}$C./sec can provide a transparent state and that lower than about $-1\times10^{2°}$C./sec can provide an opaque state.

The reversible display medium of the present invention can employ various processes to provide display. For example, the orientation of the liquid crystal is partially disturbed by laser beam or thermal head while the liquid crystal molecules are being oriented in one direction in an electric or magnetic field to assume transparent state so that light scattering portions are formed. Alternatively, the reversible display medium of the present invention can repeatedly assume a liquid crystal state (light scattering state) and a non-liquid crystal state (transparent state) under control with heat only.

A method of recording/erasing data on the display medium which displays data under control with heat only will be described hereinafter. The recording layer on the display medium prepared by the coating process assumes light scattering state (opaque state) attributable to a large number of liquid microcrystals (multi-domain structure). The recording layer is partially heated by a thermal head or laser beam to assume isotropic state. Under that state, the display medium is rapidly cooled to a temperature of not higher than the glass transition point thereof so that the heated portion is kept isotropic to render the recording portion transparent. On the other hand, the recorded data can be erased by heating the display medium, and then cooling the display medium slowly as compared with recording so that it is returned to the original light scattering state. If a thermal head is used as a means of recording/erasing, the width and energy of pulse applied to the thermal head can be controlled to perform recording/erasing.

A method of displaying data on the display medium of the present invention in an electric or magnetic field will be described hereinafter. An electric or magnetic field is applied across the display medium while the display medium is being heated to a predetermined temperature so that the liquid crystal molecules are oriented in one direction. Under that state, the display medium is cooled so that it assumes optically transparent state. The display medium is partially heated free from electric or magnetic field, and then cooled to form a multi-domain structure. Thus, data can be recorded in an opaque form on the transparent background.

The present invention will be further described in the following Examples and Comparative Example, but the present invention should not be construed as being limited thereto. All parts, percents, ratios and the like used in Examples and Comparative Example are by weight unless otherwise indicated.

EXAMPLE 1

1.9 g of 4-acryloyloxyhexyloxy-4'-cyanobiphenyl as a liquid-crystal monomer and 0.1 g of acrylic acid as a non-liquid-crystal having hydrogen-bonding substituents were subjected to polymerization in the presence of AIBN (azobisisobutyronitrile) as an initiator in tetrahydrofuran as a solvent. The product was then precipitated three times from ethanol to undergo purification to obtain 1.9 g of a high molecular weight liquid crystal represented by the following structure formula (I). The weight-average molecular weight (Mw) of the product was 30,000 in polystyrene equivalence as determined by GPC. The glass transition point (Tg) of the product was 45° C. The phase transition point of the product was 125° C.

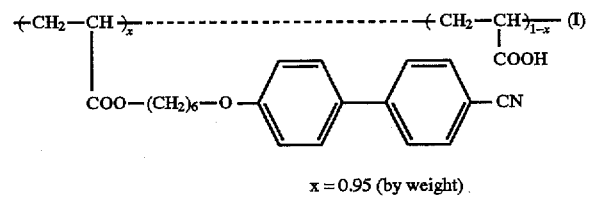

$x = 0.95$ (by weight)

A 30% methyl ethyl ketone solution of the high molecular weight liquid crystal thus obtained was applied to a 100-μm thick aluminum-plated PET film by means of a blade coater, and then dried to form a high molecular weight liquid crystal layer having a thickness of about 6 μm thereon. An ultraviolet radiation-curing polymer (Aronix UV, available from Toagosei Chemical Industry Co., Ltd.) was applied to the high molecular weight liquid crystal layer, and then cured under a high voltage mercury vapor lamp to form a protective layer having a thickness of about 3 μm. Thus, a display medium was prepared.

The display medium thus prepared was heated in a 130° C. oven, withdrawn, and then cooled so that it was entirely made opaque. When printing was effected on the display medium by means of a thermal head, the printed area became transparent to provide sharp visible letters.

EXAMPLE 2

A high molecular weight liquid crystal represented by the following structural formula (II) was synthesized in the same manner as in Example 1 except that 2-hydroxyethyl acrylate was used as a non-liquid-crystal monomer. The weight-average molecular weight (Mw) of the product was 42,000 in polystyrene equivalence as determined by GPC. The glass transition point (Tg) of the product was 40° C. The phase transition point of the product was 110° C. A display medium was prepared from the high molecular weight liquid crystal in the same manner as in Example 1.

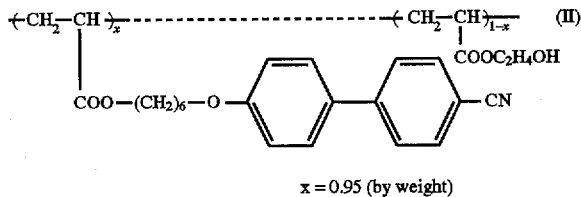

x = 0.95 (by weight)

EXAMPLE 3

A high molecular weight liquid crystal represented by the following structural formula (III) was synthesized in the same manner as in Example 1 except that methacrylic acid was used as a non-liquid-crystal monomer. The weight-average molecular weight (Mw) of the product was 33,000 in polystyrene equivalence as determined by GPC. The glass transition point (Tg) of the product was 45° C. The phase transition point of the product was 126° C. A display medium was prepared from the high molecular weight liquid crystal in the same manner as in Example 1.

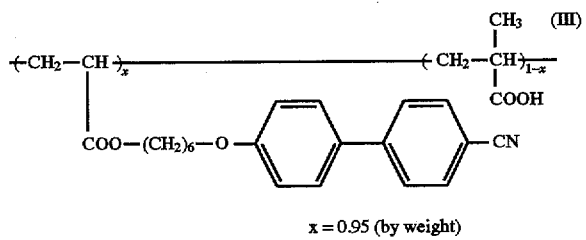

x = 0.95 (by weight)

EXAMPLE 4

A high molecular weight liquid crystal represented by the following structural formula (IV) was synthesized in the same manner as in Example 1 except that butyl acrylate was used as a non-liquid-crystal monomer. The weight-average molecular weight (Mw) of the product was 50,000 in polystyrene equivalence as determined by GPC. The glass transition point (Tg) of the product was 40° C. The phase transition point of the product was 105° C. A display medium was prepared from the high molecular weight liquid crystal in the same manner as in Example 1.

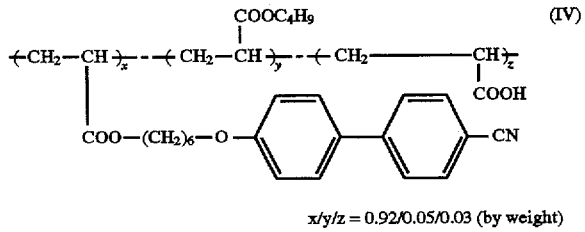

x/y/z = 0.92/0.05/0.03 (by weight)

EXAMPLE 5

1.8 g of a high molecular weight liquid crystalline copolymer consisting of constituents (A), (B) and (C) represented by the following structural formula (V) was Synthesized in the same manner as in Example 1 except that 1.2 g of 4-acryloyloxyhexyloxy-4'-cyanobiphenyl and 0.7 g of -methacryloyloxyhexyloxy-4'-cyanobiphenyl were used as liquid-crystal monomers and 0.1 g of acrylic acid was used as a non-liquid-crystal monomer. The weight-average molecular weight (Mw) of the product was 55,000 in polystyrene equivalence as determined by GPC. The glass transition point (Tg) of the product was 45° C. The phase transition point of the product was 110° C. A display medium was prepared from the high molecular weight liquid crystal in the same manner as in Example 1.

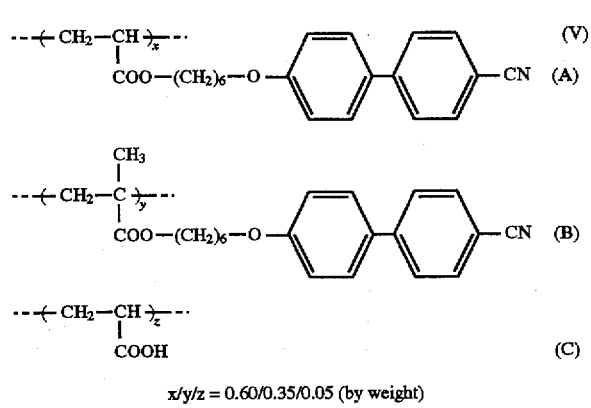

x/y/z = 0.60/0.35/0.05 (by weight)

EXAMPLE 6

A high molecular weight liquid crystal represented by the following structural formula (VI) was synthesized in the same manner as in Example 1 except that hydroxyethyl acrylate and acrylic acid were used as non-liquid-crystal monomers. The weight-average molecular weight (Mw) of the product was 45,000 in polystyrene equivalence as determined by GPC. The glass transition point (Tg) of the product was 40° C. The phase transition point of the product was 106° C. A display medium was prepared from the high molecular weight liquid crystal in the same manner as in Example 1.

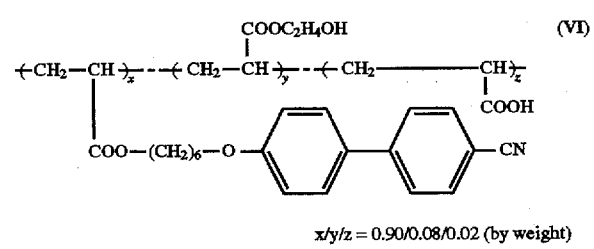

x/y/z = 0.90/0.08/0.02 (by weight)

EXAMPLE 7

1.8 g of a high molecular weight liquid crystalline copolymer consisting of constituents (A), (B), (C) and (D) represented by the following structural formula (VII) were synthesized in the same manner as in Example 1 except that 1.26 g of 4-acryloyloxyhexyloxy-4'-cyanobiphenyl and 0.68 g of 4-acryloyloxypropyloxy-4'-cyanobiphenyl were used as liquid-crystal monomers and 0.04 g of acrylic acid was used as a non-liquid-crystal monomer. The weight-average molecular weight (Mw) of the product was 40,000 in polystyrene equivalence as determined by GPC. The glass transition point (Tg) of the product was 45° C. The phase transition point of the product was 103° C. A display medium was prepared from the high molecular weight liquid crystal in the same manner as in Example 1.

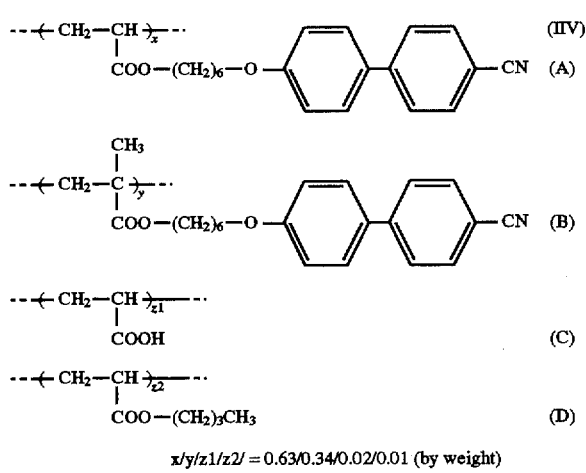

x/y/z1/z2/ = 0.63/0.34/0.02/0.01 (by weight)

COMPARATIVE EXAMPLE

A high molecular weight liquid crystalline homopolymer represented by the following structural formula (VIII) having Mw of 35,000, Tg of 35° C. and a phase transition point of 122° C. was synthesized in the same manner as in Example 1 except that 4-acryloyloxyhexyloxy-4'-cyanobiphenyl alone was used as a liquid-crystal monomer. A display medium was prepared from the high molecular weight liquid crystalline homopolymer in the same manner as in Example 1.

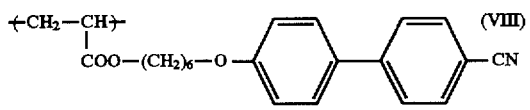

The samples of displaying media obtained in Examples 1 to 7 and Comparative Example were measured for optical density in the following manner. Contrast ratio was calculated from the optical density. These samples were also measured for distribution of particle diameter to evaluate the characteristics.

Evaluation of Recording/Erasing

Recording was effected by printing at 0.2 to 0.5 mj/dot by means of a thermal printer (corresponding to 200 dpi). Erasing was effected at an elevated temperature of about 100° to 130° C. by means of a hot stamper. Recording and erasing were alternately repeated 100 times to evaluate the durability of the samples.

Evaluation of Display Properties

The reversible display medium was evaluated for reflection optical density on the recorded portion and non-recorded portion (opaque portion) by means of X-rite404A (available from X-rite Corp.). Contrast ratio was calculated from the ratio of reflectance.

Measurement of Particle Diameter Distribution

The samples of display medium comprising a high molecular weight liquid crystal layer formed on the surface of a transparent substrate were each repeatedly subjected to recording/erasing 100 times. These samples were then measured for the diameter of domains in the multi-domain structure by means of a laser diffraction grain size distribution meter (LA:700, available from Horiba Co., Ltd.) to determine the domain distribution in the multi-domain structure and the domain diameter at the maximum distributed number of domains.

The results of the evaluations of properties are set forth in Table 1.

TABLE 1

| Sample | Optical density before printing | Optical density in printed portion | Contrast ratio (1st time) | Contrast ratio (100th time) |
|---|---|---|---|---|
| Example 1 | 0.25 | 1.8 | 35 | 35 |
| Example 2 | 0.25 | 1.8 | 35 | 35 |
| Example 3 | 0.25 | 1.8 | 35 | 35 |
| Example 4 | 0.22 | 1.8 | 38 | 37 |
| Example 5 | 0.23 | 1.8 | 37 | 37 |
| Example 6 | 0.24 | 1.8 | 36 | 36 |
| Example 7 | 0.24 | 1.8 | 35 | 35 |
| Comparative Example | 0.28 | 0.8 | 3.3 | 2.0 |

All the samples of Examples 1 to 7 exhibited an excellent whiteness (opaqueness) before printing, a reflection optical density of not more than 0.25 and a reflectance of not less than 55%. On the contrary, Comparative Example showed a low whiteness as compared with Examples 1 to 7.

As a result of printing, all the samples of Examples 1 to 7 showed a uniform transparency at the printed portion, making it possible to print sharp silver letters on a white background. All these samples exhibited a contrast ratio of not less than 20 as calculated from the optical density of the printed portion. Thus, these samples exhibited excellent display properties. On the contrary, Comparative Example showed an insufficient transparency at the printed portion, making it impossible to express sharp letters. Comparative Example exhibited a reflection contrast ratio as small as about 3.

For erasing, all the samples were returned to the original opaque state by means of a hot stamp. These samples were repeatedly subjected to printing and erasing 100 times to evaluate durability. All the samples of Examples 1 to 7 showed no change from the initial contrast ratio and hence an excellent durability. On the contrary, the sample of Comparative Example showed a great drop in the contrast ratio. This is attributable to the unevenness of the surface of the recording layer and the protective layer.

The results of the measurement of particle diameter distribution were as follows. The samples of Examples 1 to 7 which had been repeatedly subjected to recording and erasing 100 times showed a domain diameter of 290 to 880 nm at the maximum distributed number of domains. The domain diameters were distributed from 50 to 1,400 nm. On the contrary, the sample of Comparative Example which had been repeatedly subjected to recording and erasing 100 times showed a domain diameter of 1.8 μm at the maximum distributed number of domains. The domain diameters were distributed from 0.4 to 9.5 μm.

It was thus confirmed that the opaqueness (display properties) can widely vary with the domain diameter.

Thus, it was confirmed that the reversible display medium of the present invention exhibits excellent display performance as well as an excellent durability.

The reversible display medium of the present invention comprises a device constitution having a high molecular weight liquid crystal made of a copolymer of at least two components, i.e., a liquid crystal monomer component and a non-liquid-crystal monomer component having hydrogen-bonding substituents. It exhibits excellent repeatability, durability, heat sensitivity, display contrast, data storage stability and workability.

The reversible display medium of the present invention can repeatedly transmit and scatter light when acted on by heat with an electric field or a magnetic field if used. It can be thin as paper and can provide a reflective display harmless to the eyes. It can also conserve resources. Further, since it can be used in a large area and can be applied in the form of display medium for large area display device such as a white board. Moreover, since it has a high transmission contrast, it can be used as projector display medium such as OHP display sheet.

While the invention has been described in detail and with reference to specific embodiments thereof, it will be apparent to one skilled in the art that various changes and modifications can be made therein without departing from the spirit and scope thereof.

What is claimed is:

1. A reversible display medium capable of repeatedly exhibiting a transparent state and a light-scattering state by an action of at least one of heat, electric field, and magnetic field, said medium comprising a substrate having thereon a recording layer comprising a side-chain high molecular weight liquid crystal, which is a copolymer comprising at least a liquid-crystal monomer component and a non-liquid-crystal monomer component having a substituent capable of making a hydrogen bond, wherein said non-liquid-crystal monomer component is in a range of 0.1 to 50% by weight based on a total amount of said liquid-crystal monomer component and said non-liquid-crystal monomer component and the copolymer has a weight-average molecular weight between 1,000 and 1,000,000.

2. A reversible display medium as claimed in claim 1, wherein said copolymer further comprises a non-liquid-crystal monomer component having no substituent capable of making a hydrogen bond.

3. A reversible display medium as claimed in claim 1, wherein said substituent capable of making a hydrogen bond is selected from the group consisting of a carboxyl group, a sulfonic group, a phosphoric group, and a hydroxyl group.

4. A reversible display medium as claimed in claim 1, wherein said side-chain high molecular weight liquid crystal constituting said recording layer has a multi-domain structure in which the diameter of domains at the maximum distributed number of domains is not more than 3 μm.

5. A reversible display medium as claimed in claim 1, wherein a protective layer is provided on said recording layer.

6. A reversible display medium as claimed in claim 4, wherein said multi-domain structure is prepared by heating said recording layer to a temperature higher than the temperature at which said high molecular weight liquid crystal transfer from a liquid crystal state to an isotropic state, and cooling to room temperature at a cooling rate of $-1 \times 10^{2}°C./$ sec or less.

7. A reversible display medium according to claim 1, wherein the liquid-crystal monomer is selected from the group consisting of acrylic ester molecules, methacrylic ester molecules and vinyl groups bonded by a non-hydrogen bond chemical bond to a rigid liquid-crystal functional group.

8. A reversible display medium according to claim 7, wherein the rigid liquid-crystal functional group is selected from the group consisting of biphenyl, phenyl, benzoate, cyclohexylbenzene, azoxybenzene, azobenzene, azomethine, phenylpyrimidine, diphenylacetylene, biphenyl benzoate, cyclohexyl biphenyl and terphenyl.

9. A reversible display medium according to claim 7, wherein said non-hydrogen bond chemical bond comprises a bond to an alkyl spacer.

10. A reversible display medium according to claim 1, wherein the liquid-crystal monomer component is represented by at least one formula selected from the group consisting of Formula a and Formula b:

$CH_2=C(R)-COO-(CH_2)_m-O-A$ (a)  $CH_2=CH(CH_2)_m-O-A$ (b)

wherein R represents a hydrogen atom or a methyl group; m represents an integer of 1 to 30; and A represents a liquid-crystal molecule (mesogen) residue represented by a formula selected from the group consisting of:

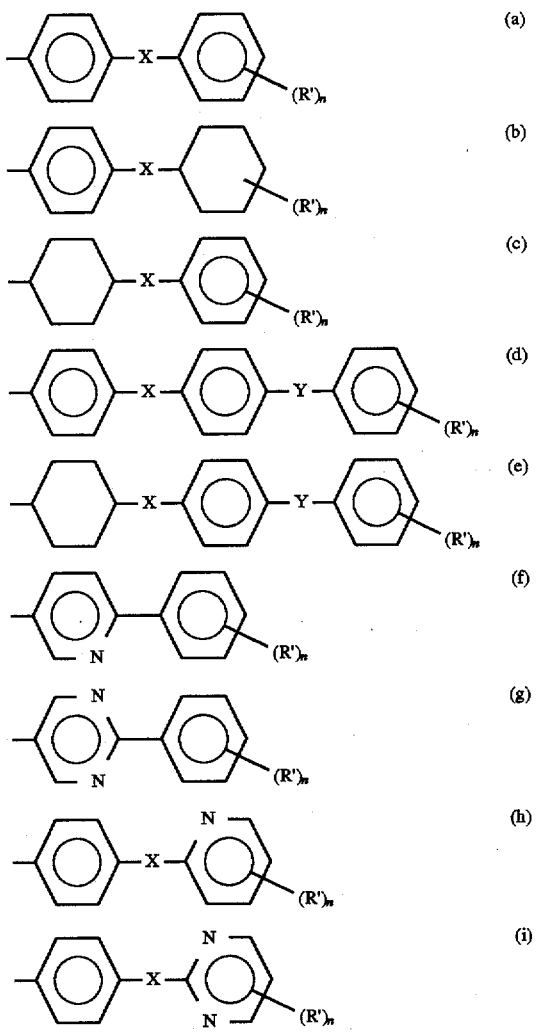

wherein x and y may be the same or different and represent a single bond, $-N=N-$, $-N(\rightarrow O)=N-$, $-CH=N-$, $-N=CH-$, $-COO-$, $-O(C=O)-$ and $-CH=CH-$; R' represents at least one moiety selected from the group consisting of halogen atom, alkyl group, alkoxy group, carboxyl group and cyano group, and n represents an integer of 1 to 5.

11. A reversible display medium according to claim 1, wherein the substituent capable of making a hydrogen bond comprises at least one substituent selected from the group consisting of hydroxyl group, carboxyl group, sulfonic group, phosphoric group, primary amino group, secondary amino group, acid amide group and thiol group.

12. A reversible display medium according to claim 1, wherein the non-liquid-crystal monomer component comprises at least one component selected from the group consisting of acrylic acid, methacrylic acid, 2-hydroxyethyl acrylate, 2-hydroxyethyl methacrylate, 2-hydroxypropyl acrylate, 2-hydroxypropyl methacrylate, 2-hydroxy-3-phenoxypropyl acrylate, 2-hydroxy-3-phenoxypropyl methacrylate, glyceryl acrylate, glyceryl methacrylate, acrylamide, methacrylamide, 2-acryloyloxyethyl succinate, 2-methacryloyloxyethyl succinate, 2-acryloyloxyethyl phthalate, 2-methacryloyloxyethyl phthalate, 2-acryloyloxyethyl-2-hydroxyethyl phthalate, 2-methacryloyloxyethyl-2-hydroxyethyl phthalate, 2-acryloyloxyethyl hexahydrophthalate, 2-methacryloyloxyethyl hexahydrophthalate, 4-(acryloyloxyalkyloxy)benzoic acid, 4-(methacryloyloxyalkyloxy)benzoic acid, mono-2-acryloyloxyethyl phosphate, mono-2-methacryloyloxyethyl phosphate, di-2-acryloyloxyethyl phosphate, di-2-methacryloyloxyethyl phosphate, hydroxy-substituted styrene, vinylsulfonic acid, 2-propene-1-ol and 5-hexene-1-ol.

13. A reversible display medium according to claim 1, wherein the non-liquid-crystal monomer component comprises at least one compound selected from the group consisting of acrylic acid, methacrylic acid, 2-hydroxyethyl acrylate, 2-hydroxyethyl methacrylate, 2-hydroxypropyl acrylate, 2-hydroxypropyl methacrylate, 2-hydroxy-3-phenoxypropyl acrylate and 2-hydroxy-3-phenoxypropyl methacrylate.

14. A reversible display medium according to claim 1, wherein the copolymer has a weight-average molecular weight between 10,000 and 500,000.

15. A reversible display medium according to claim 1, wherein said non-liquid-crystal monomer component is contained in said medium in a range of 1 to 40% by weight based on the total amount of said liquid-crystal monomer component and said non-liquid-crystal monomer component.

16. A reversible display medium according to claim 15, wherein the range is 1 to 20% by weight.

17. A reversible display medium as claimed in claim 2, wherein said non-liquid-crystal monomer having no substituent capable of making a hydrogen bond is selected from the group consisting of alkoacylate, alkomethacyrolate, styrene, vinyl acetate, vinyl chloride, vinylidene chloride, vinyl pyrrolidone, isoprene, 1-hexene and 1-octene.

\* \* \* \* \*